United States Patent
Ohta et al.

(10) Patent No.: US 9,085,082 B2
(45) Date of Patent: Jul. 21, 2015

(54) CALIBRATION METHOD AND CALIBRATION SYSTEM FOR ROBOT

(71) Applicant: JTEKT Corporation, Osaka-shi (JP)

(72) Inventors: Hiromichi Ohta, Kariya (JP); Yasuharu Mukai, Kariya (JP); Kazuya Numazaki, Chiryu (JP)

(73) Assignee: JTEKT Corporation, Osaka-shi (JP)

( * ) Notice: Subject to any disclaimer, the term of this patent is extended or adjusted under 35 U.S.C. 154(b) by 9 days.

(21) Appl. No.: 13/783,989

(22) Filed: Mar. 4, 2013

(65) Prior Publication Data

US 2013/0238126 A1    Sep. 12, 2013

(30) Foreign Application Priority Data

Mar. 6, 2012    (JP) .................................. 2012-049328

(51) Int. Cl.
*G05B 19/04* (2006.01)
*G05B 19/18* (2006.01)
*B25J 9/16* (2006.01)

(52) U.S. Cl.
CPC .............. *B25J 9/1674* (2013.01); *B25J 9/1643* (2013.01); *B25J 9/1692* (2013.01); *G05B 2219/39048* (2013.01)

(58) Field of Classification Search
CPC ...... B25J 9/1643; B25J 9/1674; B25J 9/1692; G05B 2219/39048
USPC ...................................... 700/245–264; 901/2
See application file for complete search history.

(56) References Cited

U.S. PATENT DOCUMENTS

| | | | |
|---|---|---|---|
| 5,130,632 A * | 7/1992 | Ezawa et al. | 318/568.11 |
| 7,212,945 B2 * | 5/2007 | Puchtler | 702/150 |
| 7,324,217 B2 * | 1/2008 | Herrmann et al. | 356/606 |
| 2005/0038563 A1 * | 2/2005 | Rauf et al. | 700/245 |
| 2005/0240309 A1 * | 10/2005 | Bischoff | 700/245 |
| 2009/0112316 A1 * | 4/2009 | Umemoto et al. | 623/11.11 |
| 2011/0280472 A1 * | 11/2011 | Wallack et al. | 382/153 |
| 2012/0185089 A1 * | 7/2012 | Schreiber | 700/250 |

(Continued)

FOREIGN PATENT DOCUMENTS

| | | |
|---|---|---|
| EP | 1 302 285 A2 | 4/2003 |
| EP | 1 302 285 A3 | 4/2003 |

(Continued)

OTHER PUBLICATIONS

EP1302285A2_Machine_English_Translation.*

(Continued)

*Primary Examiner* — Jason Holloway
*Assistant Examiner* — Rachid Bendidi
(74) *Attorney, Agent, or Firm* — Oblon, McClelland, Maier & Neustadt, L.L.P.

(57) ABSTRACT

A distal end of a manipulator having a redundancy is constrained so as to leave one degree of freedom, an attitude of the manipulator is changed into a plurality of attitudes that are allowed by the redundancy by outputting joint position command values from a controller to servomotors that drive links that constitute the manipulator of which the distal end is fixed, and calibration is performed by obtaining parameter deviations of a robot constant of the manipulator on the basis of the joint position command values and actual measured values from rotary encoders, which are respectively provided at the servomotors, after each attitude change.

11 Claims, 8 Drawing Sheets

(56) References Cited

U.S. PATENT DOCUMENTS

2013/0238127 A1* 9/2013 Ohta et al. .................. 700/254
2013/0245829 A1* 9/2013 Ohta et al. .................. 700/261

FOREIGN PATENT DOCUMENTS

| EP | 1302285 A2 * | 4/2003 |
| JP | 4-45842 B2 | 7/1992 |
| JP | 8-27241 | 1/1996 |
| JP | 2001-50741 | 2/2001 |

OTHER PUBLICATIONS

Extended European Search Report issued Nov. 21, 2013 in Patent Application No. 13157179.6.
David J. Bennett, et al. "Autonomous calibration of single-loop closed kinematic chains formed by manipulators with passive endpoint constraints", IEEE Transactions on Robotics and Automation, vol. 7, No. 5, XP 000234416, Oct. 1, 1991, pp. 597-606.

* cited by examiner

CALIBRATION METHOD AND CALIBRATION SYSTEM FOR ROBOT

INCORPORATION BY REFERENCE

The disclosure of Japanese Patent Application No. 2012-049328 filed on Mar. 6, 2012 including the specification, drawings and abstract is incorporated herein by reference in its entirety.

BACKGROUND OF THE INVENTION

1. Field of the Invention

The invention relates to a calibration method and calibration system for a robot and, more particularly, to a calibration method and calibration system for a robot having a redundancy.

2. Description of Related Art

A calibration method for mechanism parameters, or the like, of a robot is known as a method described in Japanese Patent Application Publication No. 8-27241 (JP 8-27241 A), Japanese Patent Application Publication No. 2001-50741 (JP 2001-50741 A), or the like. In JP 8-27241 A, a robot is calibrated by a method of collectively calibrating a hand camera and the robot at the same time.

In JP 2001-50741 A, the distal end of a three-dimensional measuring device is coupled to the distal end of an arm of a robot, the position and attitude of the distal end portion of the arm of the robot are measured, and a plurality of teach points are measured while changing the position and attitude of the robot. By so doing, mechanism parameters of the robot are obtained, and calibration is performed.

Japanese Patent Publication No. 4-45842 describes a method of changing the attitude of a robot distal end in a state where the robot distal end is engaged with a displacement detector and then performing calibration on the basis of data of joint angles of joints and data of the displacement detector.

JP 8-27241 A to Japanese Patent Publication No. 4-45842 require a hand camera, a three-dimensional measuring device or a displacement detector, so cost increases.

SUMMARY OF THE INVENTION

The invention provides a calibration method and calibration system for a robot having a redundancy, which are able to perform calibration without using a device, such as a three-dimensional measuring device, a displacement detector and a hand camera.

A first aspect of the invention provides a calibration method for a robot having a redundancy. The calibration method includes: constraining a distal end of a manipulator having a redundancy so as to leave at least one degree of freedom within degrees of freedom of the manipulator; changing an attitude of the manipulator into a plurality of attitudes that are allowed by the redundancy by outputting joint position command values from a control device to actuators that drive links that constitute the manipulator of which the distal end is constrained; and performing calibration by obtaining a deviation of a robot constant of the manipulator on the basis of the joint position command values and actual measured values from position detectors after each attitude change, the position detectors being respectively provided for the actuators. Here, the robot constant is a constant unique to the robot.

With the above configuration, it is possible to provide the calibration method for a robot, which is able to perform calibration without using a device, such as a three-dimensional measuring device, a displacement detector and a hand camera.

In the calibration method, calibration may be performed by obtaining the deviation of the robot constant of the manipulator on the basis of differences between the joint position command values for the plurality of attitude changes and the actual measured values from the position detectors after the attitude changes, and attitude parameters at the time of the plurality of attitude changes, and the attitude parameters may be obtained on the basis of the actual measured values. The attitude parameter is a parameter by which the position and attitude of the manipulator can be specified at the time when the position and attitude are changed by the unconstrained degree of freedom within the degrees of freedom of the manipulator. Thus, the number of the attitude parameters coincides with the number of left degrees of freedom, for example, in the case where 1 degree of freedom is left, the number of the attitude parameters is 1, and, in the case where 2 degrees of freedom are left, the number of the attitude parameters is 2.

With the above configuration, calibration is performed by obtaining the deviation of the robot constant of the manipulator on the basis of the differences between the joint position command values and the actual measured values for each different attitude and the attitude parameters, so it is possible to easily achieve the calibration method for a robot, which is able to perform calibration without using a device, such as a three-dimensional measuring device, a displacement detector and a hand camera.

In the calibration method, the manipulator may have one degree of redundancy that is a difference between the number of dimensions of a working space of the manipulator and degrees of freedom of a link structure of the manipulator.

With the above configuration, in the manipulator in which a difference between the number of dimensions of a working space of the manipulator and the degrees of freedom of the link structure of the manipulator is 1, it is possible to easily achieve the calibration method for a robot, which is able to perform calibration without using a device, such as a three-dimensional measuring device, a displacement detector and a hand camera.

In the calibration method, a reference point at which the distal end of the manipulator is constrained may be a reference location at which a workpiece that the manipulator works on is placed.

With the above configuration, the reference point is set to the reference location at which a workpiece that the manipulator works on is placed, so it is possible to provide the calibration method by which a tool is able to accurately work on the workpiece.

A second aspect of the invention provides a calibration system having a redundancy. The calibration system includes: a manipulator that includes a plurality of links coupled so as to have a redundancy, actuators respectively provided at joints of the links and position detectors that are respectively provided at the actuators and that respectively detect positions of joint axes of the links; a control device configured to change an attitude of the manipulator into a plurality of attitudes that are allowed by the redundancy by outputting joint position command values to the actuators in a state where a distal end of the manipulator is constrained so as to leave at least one degree of freedom within degrees of freedom of the manipulator; and a computing unit configured to perform calibration by obtaining a deviations of a robot constant of the manipulator on the basis of the joint position command values and actual measured values from the position detectors after each attitude change.

With the above configuration, it is possible to provide the calibration system for a robot, which is able to perform calibration without using a device, such as a three-dimensional measuring device, a displacement detector and a hand camera.

In the calibration system, the computing unit may be configured to perform calibration by obtaining the deviation of the robot constant of the manipulator on the basis of differences between the joint position command values for the plurality of attitude changes and the actual measured values from the position detectors after the attitude changes, and attitude parameters at the time of the plurality of attitude changes, and the attitude parameters may be obtained on the basis of the actual measured values.

With the above configuration, calibration is performed by obtaining the deviation of the robot constant of the manipulator on the basis of the differences between the joint position command values and the actual measured values in each different attitude and the attitude parameters, so it is possible to easily achieve the calibration system for a robot, which is able to perform calibration without using a device, such as a three-dimensional measuring device, a displacement detector and a hand camera.

In the calibration system, the manipulator may have one degree of redundancy that is a difference between the number of dimensions of a working space of the manipulator and degrees of freedom of a link structure of the manipulator.

With the above configuration, in the manipulator in which a difference between the number of dimensions of a working space of the manipulator and the degrees of freedom of the link structure of the manipulator is 1, it is possible to easily achieve the calibration system for a robot, which is able to perform calibration without using a device, such as a three-dimensional measuring device, a displacement detector and a hand camera.

In the calibration system, a reference point at which the distal end of the manipulator is constrained may be a reference location at which a workpiece that the manipulator works on is placed.

With the above configuration, the reference point is set to the reference location at which a workpiece that the manipulator works on is placed, so it is possible to provide the calibration system by which a tool is able to accurately work on the workpiece.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Hereinafter, a calibration method and calibration system for a robot having a redundancy according to a first embodiment that is an example of the invention will be described with reference to FIG. 1 to FIG. 5.

Figure 1:
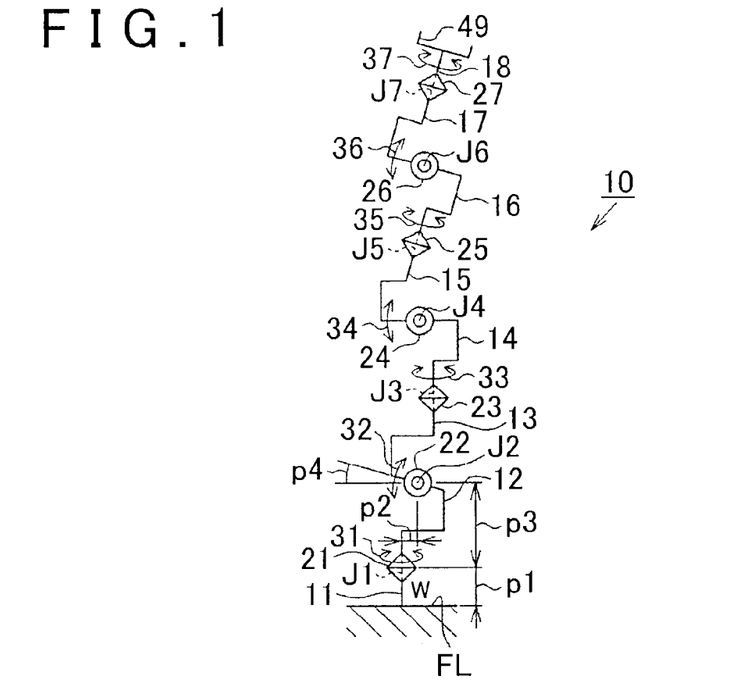
FIG. 1 is a skeletal view of a manipulator having a redundancy according to a first embodiment of the invention.

First, a manipulator having a redundancy according to the present embodiment will be described. As shown in FIG. 1, the manipulator 10 is formed by serially coupling eight links 11 to 18 by seven joints 21 to 27. The manipulator 10, which is an articulated robot, is a robot that has 7 degrees of freedom (degree of freedom n=7), in which the links 12 to 18 are allowed to turn at the seven joints 21 to 27. The number of dimensions (number of dimensions m) of a working space of the manipulator 10 is 6, and has one degree of redundancy (=n−m).

One end of the first link 11 is fixed to a floor surface FL, and the other end of the first link 11 is connected to one side of the first joint 21. One end of the second link 12 is connected to the other side of the first joint 21, and one side of the second joint 22 is connected to the other end of the second link 12. Similarly, the third link 13, the fourth link 14, the fifth link 15, the sixth link 16, the seventh link 17 and the eighth link 18 are respectively coupled sequentially via the third joint 23, the fourth joint 24, the fifth joint 25, the sixth joint 26 and the seventh joint 27.

The other side of the first joint 21 is rotatable about an axis extending vertically in FIG. 1 with respect to the one side of the first joint 21 as indicated by an arrow 31. Thus, the second link 12 is turnable in a direction indicated by the arrow 31 about the rotation axis (J1 axis) of the first joint 21 with respect to the adjacent first link 11.

The other side of the second joint 22 is rotatable about an axis (J2 axis) extending in a direction perpendicular to the sheet in FIG. 1 with respect to the one side of the second joint 22 as indicated by an arrow 32. Thus, the third link 13 is rotatable in a direction indicated by the arrow 32 about the rotation axis of the second joint 22 with respect to the adjacent second link 12.

The third joint 23, the fourth joint 24, the fifth joint 25, the sixth joint 26 and the seventh joint 27 each are rotatable, and the fourth link 14, the fifth link 15, the sixth link 16, the seventh link 17 and the eighth link 18 are also respectively turnable in directions indicated by arrows 33 to 37 about the rotation axes (J3 axis to J7 axis) of the joints 23 to 27. Note that in the entire specification, the pairs of links 11 to 18 that are coupled via the corresponding joints 21 to 27 are termed mutually adjacent pairs of links 11 to 18. The J1 axis to the J7 axis correspond to joint axes.

Figure 2:
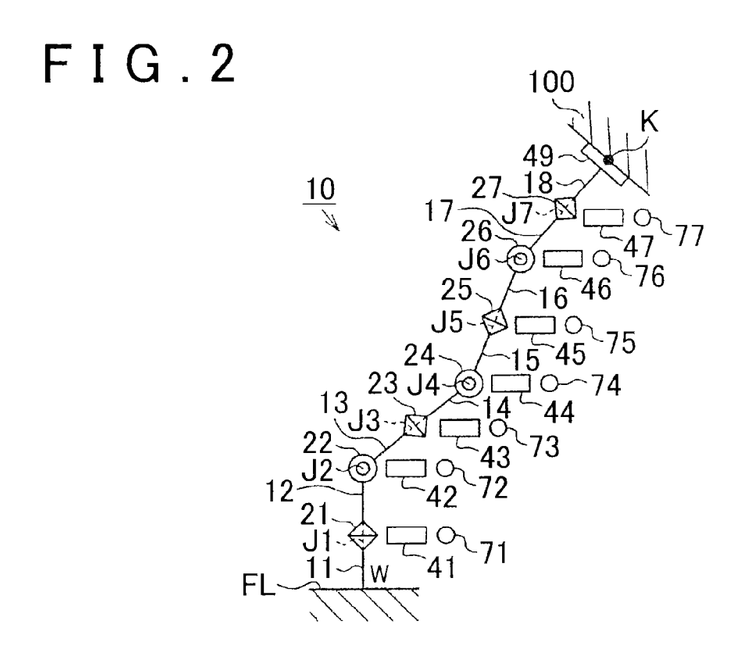
FIG. 2 is a schematic configuration view that shows a state where the distal end of the manipulator having a redundancy according to the first embodiment is fixed.

FIG. 2 shows the manipulator 10 in simplified skeletal view as compared with FIG. 1. As shown in the drawing, a first servomotor 41 is installed in the first joint 21. When electric power is supplied to the first servomotor 41, the first servomotor 41 turns the second link 12 with respect to the first link 11.

A second servomotor 42 is installed in the second joint 22. When electric power is supplied to the second servomotor 42, the second servomotor 42 turns the third link 13 with respect to the second link 12. Similarly, servomotors 43 to 47 are respectively installed in the third joint 23, the fourth joint 24, the fifth joint 25, the sixth joint 26 and the seventh joint 27. When electric power is supplied to the servomotors 43 to 47, the servomotors 43 to 47 respectively turn the corresponding links 14 to 18.

The motors are provided in the corresponding joints; however, in FIG. 2, the motors are shown separately from the joints for the sake of convenience of illustration. In the present embodiment, AC motors that serve as the servomotors are used as actuators; however, the actuators are not limited to them.

A tool 49 is mounted at the distal end of the eighth link 18. The tool 49 together with the eighth link 18 is turnable in a direction indicated by an arrow 37 about the rotation axis (J7 axis) of the seventh joint 27 as shown in FIG. 1. The tool 49 is, for example, a hand that is able to grasp a workpiece, or the like. The type of tool 49 does not affect the invention, so it is not limited.

As described above, the manipulator 10 causes an accumulated rotation angle of the second link 12 to eighth link 18 to work on the tool 49 provided at the distal end portion by turning the second link 12 to the eighth link 18 by driving the first servomotor 41 to the seventh servomotor 47, so it is possible to bring the position and attitude of the distal end of the tool 49 into coincidence with a target position and a target attitude appropriate for work of the tool 49.

Figure 3:
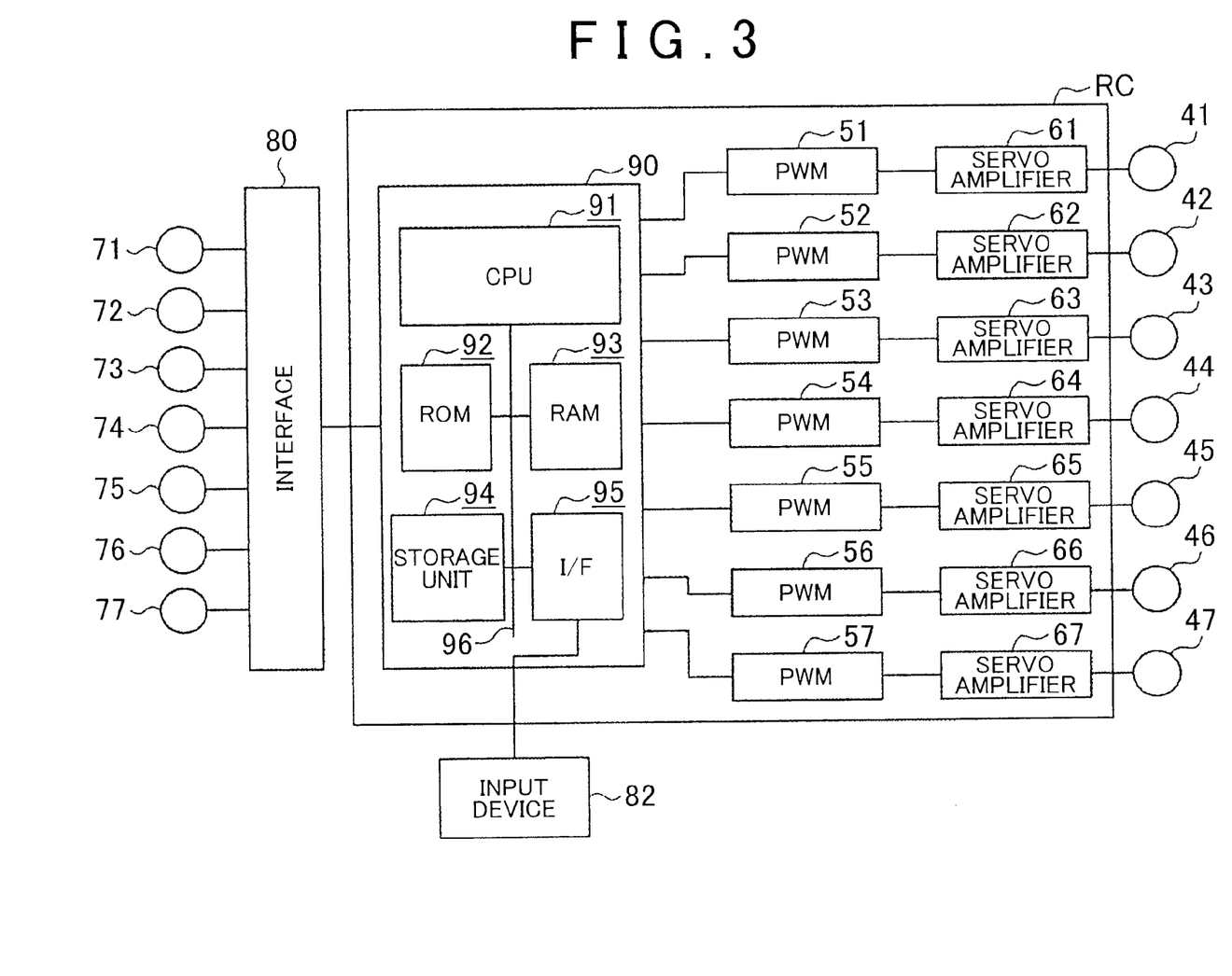
FIG. 3 is a schematic configuration view of a calibration system for a robot having a redundancy according to the first embodiment.

Next, the electrical configuration of the articulated robot will be described by focusing on a controller RC that serves as a control device that controls the manipulator 10 with reference to FIG. 3. The controller RC includes a computer 90, PWM generators 51 to 57 and servo amplifiers 61 to 67. The PWM generators 51 to 57 are electrically connected to the computer 90. The servo amplifiers 61 to 67 are respectively electrically connected to the PWM generators 51 to 57. The servo amplifiers 61 to 67 are respectively electrically connected to the first servomotor 41 to the seventh servomotor 47.

The computer 90 outputs joint position command values (drive commands) to the PWM generators 51 to 57. The PWM generators 51 to 57 respectively output PWM signals to the servo amplifiers 61 to 67 on the basis of the joint position command values (drive commands). The servo amplifiers 61 to 67 respectively turn the links 12 to 18 by actuating the servomotors 41 to 47 on the basis of outputs thereof.

Rotary encoders 71 to 77 are respectively incorporated in the servomotors 41 to 47, and are connected to the computer 90 via an interface 80. The rotary encoders 71 to 77 respectively detect the rotation angles of the servomotors 41 to 47, by extension, respectively detect the rotation angles of the links 12 to 18 with respect to the corresponding adjacent links 11 to 17, and transmit the detection signals to the controller RC. The rotary encoders 71 to 77 correspond to position detectors. Each of the position detectors is not limited to the rotary encoder. Each of the position detectors may be a resolver or a potentiometer.

Instead of respectively providing the rotary encoders 71 to 77 at the first servomotor 41 to the seventh servomotor 47, sensors that are able to respectively directly detect the rotation angles of the links 12 to 18 may be provided at the links 11 to 18 or the first joint 21 to the seventh joint 27.

The computer 90 includes a CPU 91, a ROM 92, a RAM 93, a nonvolatile storage unit 94, such as a hard disk, an interface 95, and the like, which are electrically connected to one another via a bus 96.

The storage unit 94 stores various data, work programs for causing the robot to carry out various types of work, a calibration program, various parameters, and the like. The ROM 92 stores a system program of an overall system. The RAM 93 is a working memory of the CPU 91, and temporarily stores data when various processings, or the like, are executed. The CPU 91 corresponds to a computing unit.

An input device 82 is connected to the controller RC via the interface 95. The input device 82 is an operating panel that has a monitor screen, various input keys (which are not shown), and the like, and allows a user to input various data. The input device 82 has a power switch of the articulated robot, and allows to input a final target position and final target attitude of the distal end of the tool 49 mounted at the distal end portion of the manipulator 10, a position and attitude of the distal end of the tool 49 at an interpolation point to the computer 90 and allows an input for changing the attitude of the manipulator 10 utilizing the redundancy through jog operation, or the like, to the computer 90.

In the present embodiment, the calibration system is formed of the manipulator 10, the controller RC and the CPU 91 of the controller RC. The manipulator 10 includes the first link 11 to the eighth link 18, the first servomotor 41 to the seventh servomotor 47 and the rotary encoders 71 to 77.

Operation of First Embodiment

Next, the operation of the calibration method and calibration system for an articulated robot according to the present embodiment will be described.

Figure 5:
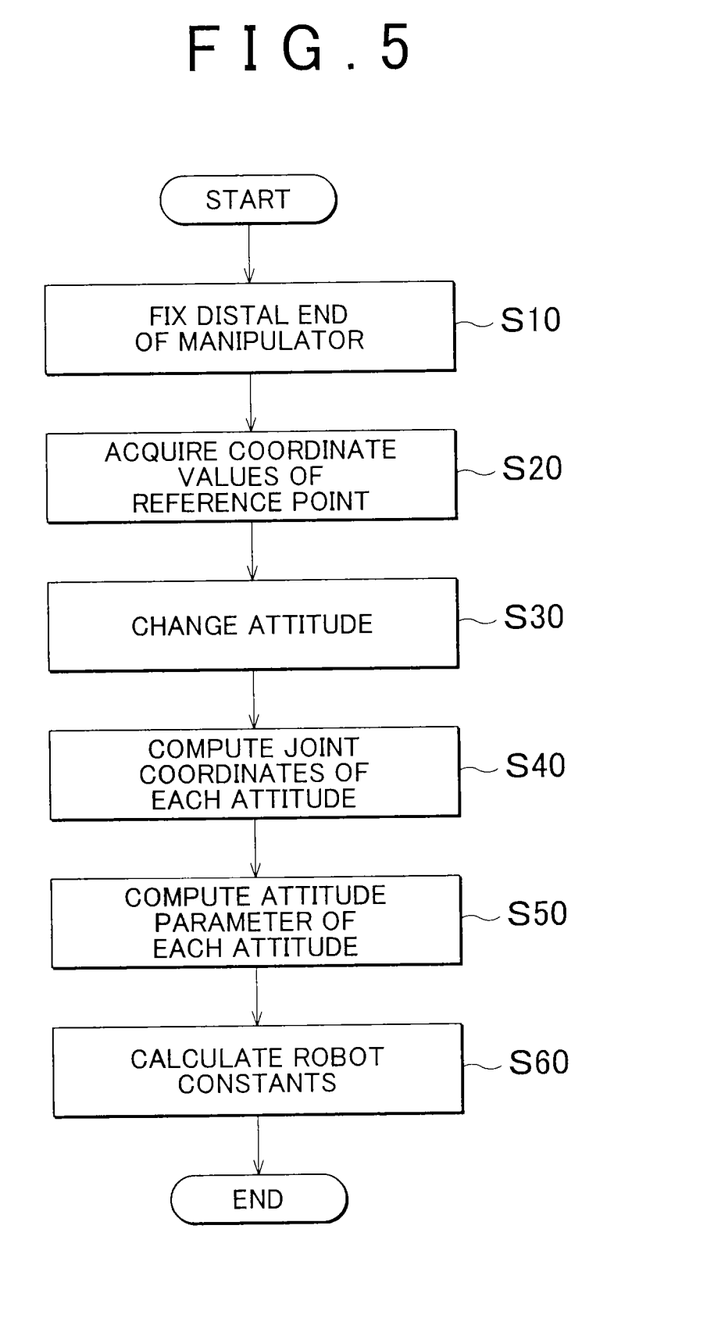
FIG. 5 is a flowchart of the calibration method according to the first embodiment.

FIG. 5 is a flowchart of the calibration method. First, in step 10 (hereinafter, step is abbreviated as "S"), the distal end of the manipulator 10 is fixed to a fixed object 100 via the tool 49 as shown in FIG. 2 in a state where the power of the robot is turned off. The fixed object 100 is able to fix the distal end of the manipulator 10. The fixed object 100 just needs to be a non-movable object. A method of fixing the tool 49 to the fixed object 100 is not limited, and, for example, a worker fixes the tool 49 to the fixed object 100 by fastening with the use of a bolt and a nut, or the like. In the present embodiment, fixing the distal end of the manipulator 10 to the fixed object 100 means constraining 6 degrees of freedom within 7 degrees of freedom of the manipulator 10 and leaving 1 degree of freedom.

Subsequently, in S20, the worker measures coordinate values of the fixed object 100 as a reference point K in a world coordinate system with the use of a measuring jig, or the like, in advance and stores the coordinate values in the storage unit 94 via the input device 82. Here, the world coordinate system is a three-dimensional coordinate system in the case where a certain place is set as a point of origin in an actual space. In the present embodiment, the world coordinate system is a three-dimensional system that uses a connection point between the first link 11 of the manipulator 10 and the floor surface FL as a point of origin. In the present embodiment, when the manipulator 10 uses a hand as the tool 49, the reference point K is a reference location at which a workpiece that the hand is able to grasp, that is, the hand works on, is placed. The reference location is, for example, a location at which a reference jig, or the like, is fixed.

Subsequently, the worker uses the input device 82 to actuate the manipulator 10 through jog operation, and, in a state where the power (not shown) of the robot is turned on, uses the input device 82 to perform jog operation to thereby position the manipulator 10 in an attitude that is allowed by the redundancy of the manipulator 10. That is, in the present embodiment, the link structure of the manipulator 10 has 7 degrees of freedom, and the number of dimensions of the working space of the manipulator 10 is 6, so the difference therebetween is 1. In the present embodiment, this redundancy is utilized.

Figure 4:
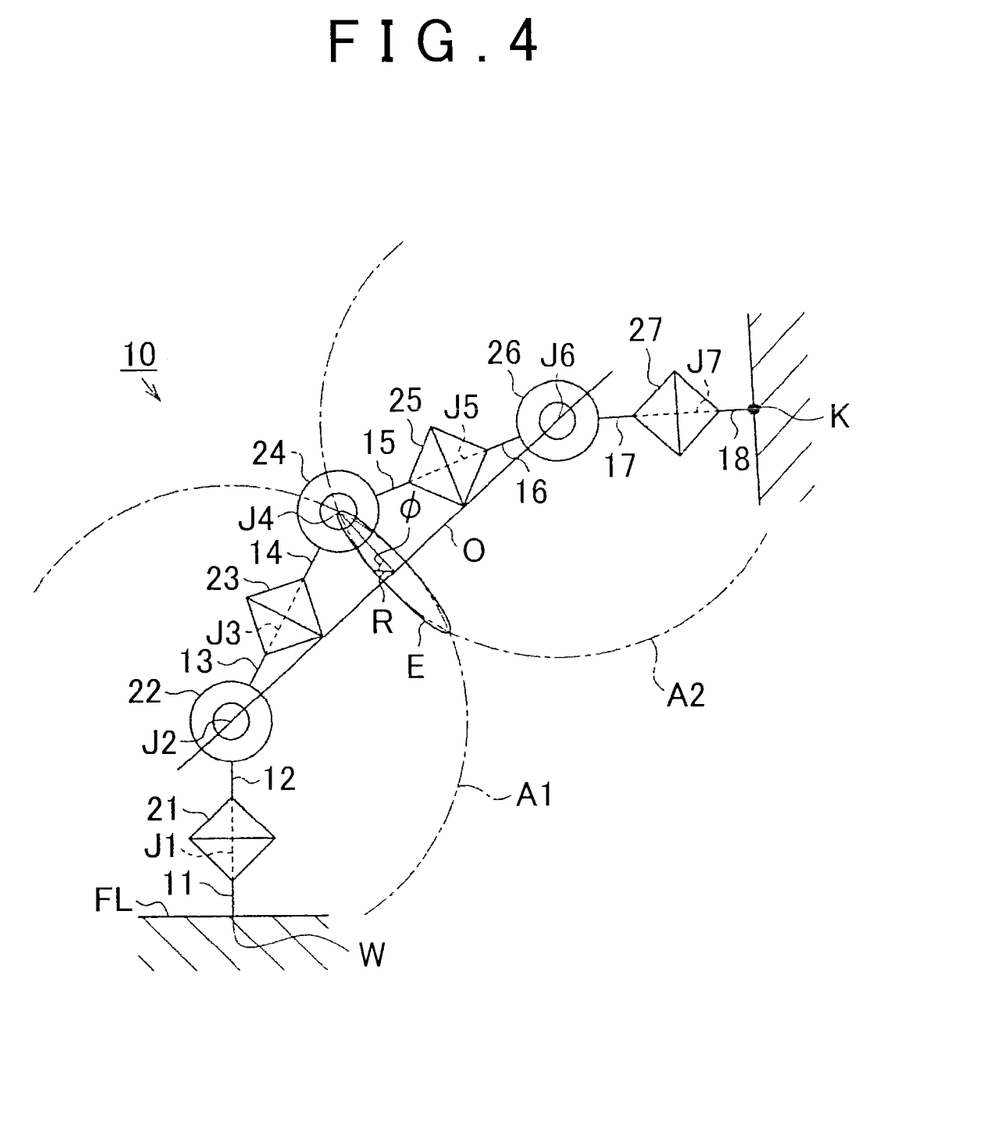
FIG. 4 is a schematic view for illustrating a calibration method for a robot having a redundancy according to the first embodiment.

Specifically, as shown in FIG. 4, the fourth joint 24 of the manipulator 10 is able to move along a crossed circle E that is formed by a sphere A1 having a center that coincides with the intersection of the J1 axis with the J2 axis and a radius that is the total of the link lengths of the third link 13 and fourth link 14 and a sphere A2 having a center that coincides with the intersection of the J6 axis with the J7 axis and a radius that is the total of the link lengths of the fifth link 15 and sixth link 16.

In the present embodiment, the worker changes the attitude of the manipulator 10 through jog operation of the input device 82 such that the fourth joint 24 is located along the crossed circle E, after the attitude change, the worker operates the input device 82 to cause the CPU 91 to acquire the rotation angles of the joints during the attitude change from the rotary encoders 71 to 77.

The CPU 91 stores the joint position command values to be output to the servomotors 41 to 47 and the rotation angles of the joints, which are acquired during the attitude change, in the storage unit 94 in association with each other on the basis of the signals input through jog operation during the attitude change.

The worker uses the input device 82 to change the attitude and, after the attitude change, to acquire the rotation angles of the joints during the attitude change a number of times that is larger than or equal to the number of robot constants.

In S40, the worker starts up the calibration program by operating the input device 82. As the program is started up, the CPU 91 computes joint coordinates θ1 to θ7 of the joints for each attitude change on the basis of the rotation angles of the joints acquired for each attitude change in S30, and stores those calculated results in the storage unit 94.

The joint coordinates of each joint are the coordinate values of the joint between each link and the corresponding adjacent link, and are, for example, the coordinate values of the first joint 21, which is the joint between the first link 11 and the second link 12, in the world coordinate system. The CPU 91 acquires the joint coordinates of each of the first joint 21 and the second joint 22 to the seventh joint 27 in the world coordinate system on the basis of the rotation angles acquired from the rotary encoders 71 to 77, and stores the calculated results in the storage unit 94.

In S50, an attitude parameter Φ in each attitude change in S30 is computed. Incidentally, as shown in FIG. 4, a central axis O that passes through the center of the crossed circle E is an axis that passes through both the intersection of the J1 axis with the J2 axis and the intersection of the J6 axis with the J7 axis. Because the fourth joint 24 is located along the crossed circle E, the attitude parameter Φ may be expressed as a parameter that indicates a position along the crossed circle E. An angle from an arbitrary position R along the crossed circle E to the changed position is defined as the attitude parameter Φ here. The attitude parameter Φ may be calculated from the joint coordinates calculated in S40.

For example, the coordinate values of the joint (fourth joint 24) that draws a locus along the crossed circle E are obtained for each attitude change, and the center of curvature of the crossed circle E is obtained from a plurality of sets of the coordinates of the joint. Then, a line that connects the coordinate values of the arbitrary position R along the crossed circle E to the center of curvature is set as a reference line, and a turning angle of the position of the fourth joint 24 along the locus of the crossed circle E after attitude change is set as the attitude parameter Φ. When the attitude parameter Φ is determined, it is possible to specify the attitude of the manipulator 10 in the case where the distal end of the manipulator 10 is fixed.

In S60, the CPU 91 calculates the robot constants on the basis of the reference point K, the joint coordinates and the attitude parameters Φ.

Here, calculation of the robot constants will be specifically described. The robot constants are constants unique to the robot, and typically include link lengths, a position gap (offset) between any adjacent links, a twist, an offset value of the encoder of each joint axis, a warpage of each link, or the like. In FIG. 1, p1 to p4 are illustrated as the robot constants. The robot constant p1 is, for example, the link length of the first link 11, the robot constant p2 is an offset between the first joint 21 and the second joint 22, the robot constant p3 is the link length of the second link 12, and the robot constant p4 is an angle of the third link 13 from a reference plane that passes through the second joint 22. These are illustrative and not restrictive. Robot constants before calibration are stored in the storage unit 94 in advance.

The following definition applies to the following mathematical expressions that are calculated using the robot constants. The position and attitude of the reference point K are denoted by X(x, y, z, a, b, c). x, y, z denote three-dimensional coordinate values in the world coordinate system, and a, b, c respectively denote the rotation angles (yaw angle, pitch angle, roll angle) around the three-dimensional axes.

The joint coordinates are denoted by θ(θ1, θ2, ..., θ7). The robot constants are denoted by p(p1, p2, ..., pn). n denotes the number of the robot constants. The attitude parameters are denoted by Φ(Φ1, Φ2, ..., Φk). k is the number of attitude changes.

The joint coordinates θ1 to θ7 may be expressed by the following mathematical expression (1).

[Mathematical Expression 1]

$$\begin{aligned} \theta_1 &= f_1(X, p, \phi) \\ \theta_2 &= f_2(X, p, \phi) \\ &\vdots \\ \theta_7 &= f_7(X, p, \phi) \end{aligned} \qquad (1)$$

When the mathematical expression (1) is totally differentiated, it may be expressed by the mathematical expression (2).

[Mathematical Expression 2]

$$\begin{aligned} d\theta_1 &= \frac{\partial f_1(X, p, \phi)}{\partial p_1} dp_1 + \frac{\partial f_1(X, p, \phi)}{\partial p_2} dp_2 + \ldots + \frac{\partial f_1(X, p, \phi)}{\partial p_n} dp_n \\ d\theta_2 &= \frac{\partial f_2(X, p, \phi)}{\partial p_1} dp_1 + \frac{\partial f_2(X, p, \phi)}{\partial p_2} dp_2 + \ldots + \frac{\partial f_2(X, p, \phi)}{\partial p_n} dp_n \\ &\vdots \\ d\theta_7 &= \frac{\partial f_7(X, p, \phi)}{\partial p_1} dp_1 + \frac{\partial f_7(X, p, \phi)}{\partial p_2} dp_2 + \ldots + \frac{\partial f_7(X, p, \phi)}{\partial p_n} dp_n \end{aligned} \qquad (2)$$

Here, dθ indicates a difference between the joint position command value and the coordinate values (that is, actual values) that are obtained from the rotation angle of the corresponding one of the rotary encoders 71 to 77.

There is a case where a function f cannot be analytically obtained, so a differential coefficient is replaced with a difference on the assumption that the differential coefficient is a small variation of the function f against a small variation of the robot constant p, and this mathematical expression is expressed by the following mathematical expression (3).

[Mathematical Expression 3]

$$d\theta_1 = \frac{\Delta f_1(X, p, \phi)}{\Delta p_1}dp_1 + \frac{\Delta f_1(X, p, \phi)}{\Delta p_2}dp_2 + \ldots + \frac{\Delta f_1(X, p, \phi)}{\Delta p_n}dp_n$$

$$d\theta_2 = \frac{\Delta f_2(X, p, \phi)}{\Delta p_1}dp_1 + \frac{\Delta f_2(X, p, \phi)}{\Delta p_2}dp_2 + \ldots + \frac{\Delta f_2(X, p, \phi)}{\Delta p_n}dp_n$$

$$\vdots$$

$$d\theta_7 = \frac{\Delta f_7(X, p, \phi)}{\Delta p_1}dp_1 + \frac{\partial f_7(X, p, \phi)}{\Delta p_2}dp_2 + \ldots + \frac{\Delta f_7(X, p, \phi)}{\Delta p_n}dp_n \quad (3)$$

[Mathematical Expression 4]

$$d\theta = \begin{bmatrix} d\theta_{1\phi=\phi_1} \\ d\theta_{2\phi=\phi_1} \\ \vdots \\ d\theta_{7\phi=\phi_1} \\ \vdots \\ d\theta_{1\phi=\phi_k} \\ d\theta_{2\phi=\phi_k} \\ \vdots \\ d\theta_{7\phi=\phi_k} \end{bmatrix}, J = \begin{bmatrix} \frac{\Delta f_1(\phi_1)}{\Delta p_1} & \frac{\Delta f_1(\phi_1)}{\Delta p_2} & \cdots & \frac{\Delta f_1(\phi_1)}{\Delta p_n} \\ \frac{\Delta f_2(\phi_1)}{\Delta p_1} & \frac{\Delta f_2(\phi_1)}{\Delta p_2} & \cdots & \frac{\Delta f_2(\phi_1)}{\Delta p_n} \\ \vdots \\ \frac{\Delta f_7(\phi_1)}{\Delta p_1} & \frac{\Delta f_7(\phi_1)}{\Delta p_2} & \cdots & \frac{\Delta f_7(\phi_1)}{\Delta p_n} \\ \vdots \\ \frac{\Delta f_1(\phi_k)}{\Delta p_1} & \frac{\Delta f_1(\phi_k)}{\Delta p_2} & \cdots & \frac{\Delta f_1(\phi_k)}{\Delta p_n} \\ \frac{\Delta f_2(\phi_k)}{\Delta p_1} & \frac{\Delta f_2(\phi_k)}{\Delta p_2} & \cdots & \frac{\Delta f_2(\phi_k)}{\Delta p_n} \\ \vdots \\ \frac{\Delta f_7(\phi_k)}{\Delta p_1} & \frac{\Delta f_7(\phi_k)}{\Delta p_2} & \cdots & \frac{\Delta f_7(\phi_k)}{\Delta p_n} \end{bmatrix}, \quad (4)$$

$$dp = \begin{bmatrix} dp_1 \\ dp_2 \\ \vdots \\ dp_n \end{bmatrix}$$

In the mathematical expression (4), "q$\phi$=$\phi$r" (q=1 to 7, r=1 to k) suffixed to d$\theta$ indicates that q relates to the Jq axis, and r relates to the rth attitude change.

In the mathematical expression (4), when the differences dO between the joint position command values and the corresponding actual measured values, Jacobian matrix J and parameter deviations dp are defined, the following mathematical expression is obtained.

[Mathematical Expression 5]

$$d\theta = J dp \quad (5)$$

When a solution to the above mathematical expression is obtained through a method of least squares, the following mathematical expression is obtained.

[Mathematical Expression 6]

$$dp = (J^T J)^{-1} J^T d\theta \quad (6)$$

Therefore, it is possible to calculate the parameter deviations dp.

The CPU 91 updates the robot constants from the obtained parameter deviations and repeatedly makes convergence calculation until the distal end positional deviation becomes smaller than or equal to a preset threshold. Thus, the CPU 91 identifies the robot constants. The present embodiment has the following features.

(1) The calibration method according to the present embodiment leaves 1 degree of freedom by constraining the distal end of the manipulator 10 having a redundancy, changes the attitude of the manipulator 10 into a plurality of attitudes that are allowed by the redundancy by outputting the joint position command values from the controller RC (control device) to the servomotors 41 to 47 (actuators) that drive the links 12 to 18 that constitute the manipulator 10 of which the distal end is fixed, and performs calibration by obtaining parameter deviations dp of the robot constants p of the manipulator 10 from the joint position command values and actual measured values from the rotary encoders 71 to 77 (position detectors) provided at the servomotors 41 to 47 (actuators), after each attitude change. As a result, according to the present embodiment, for a robot having a redundancy, it is possible to perform calibration without using a device, such as a three-dimensional measuring device, a displacement detector and a hand camera.

(2) The calibration method according to the present embodiment performs calibration by obtaining the parameter deviations dp of the robot constants p of the manipulator 10 on the basis of differences between the joint position command values for a plurality of attitude changes and the actual measured values from the rotary encoders 71 to 77 (position detectors) provided at the servomotors 41 to 47 (actuators), after the attitude changes, and the attitude parameters $\Phi$ at the time of the plurality of attitude changes, the attitude parameters $\Phi$ being obtained on the basis of the actual measured values. As a result, with the method according to the present embodiment, calibration is performed by obtaining the parameter deviations dp of the robot constants of the manipulator on the basis of the differences between the joint position command values and the actual measured values and the attitude parameter for each different attitude, so it is possible to easily achieve the advantageous effect described in the above (1).

(3) The calibration method according to the present embodiment is able to easily achieve the advantageous effects described in the above (1) and (2) for the manipulator 10 that has one degree of redundancy that is a difference between the number of dimensions of the working space of the manipulator 10 and the degree of freedom of the link structure of the manipulator 10.

(4) The calibration method according to the present embodiment has such a feature that the reference point K at which the distal end of the manipulator 10 is constrained is set to a reference location at which a workpiece that the manipulator 10 works on is placed. As a result, with the method according to the present embodiment, the reference point is set to the reference location at which a workpiece that the manipulator 10 works on is placed, so it is possible for the tool to accurately work on the workpiece.

(5) The calibration system according to the present embodiment includes the manipulator 10 that includes the links 12 to 18 coupled so as to have a redundancy, the servomotors 41 to 47 (actuators) respectively provided for the joints of the links and the rotary encoders (position detectors) that respectively detect the positions of the J1 axis to J7 axis (joint axes) of the links, and the controller RC (control device) that changes the attitude of the manipulator 10 into a plurality of attitudes that are allowed by the redundancy by outputting the joint position command values to the servomotors 41 to 47 (actuators) in a state where the distal end of the manipulator 10 is constrained so as to leave 1 degree of freedom within the degrees of freedom of the manipulator 10. In addition, the calibration system includes the CPU 91 (computing unit) that performs calibration by obtaining parameter deviations dp of the robot constants p of the manipulator 10 from the joint position command values and actual measured values from the rotary encoders 71 to 77 (position detectors) provided at the servomotors 41 to 47 (actuators), after each attitude change. As a result, according to the present embodiment, for a robot having a redundancy, it is possible to provide the calibration system that is able to perform calibration without using a device, such as a three-dimensional measuring device, a displacement detector and a hand camera.

(6) The CPU 91 (computing unit) of the calibration system according to the present embodiment performs calibration by obtaining the parameter deviations dp of the robot constants p of the manipulator 10 on the basis of differences between the joint position command values for a plurality of attitude changes and the actual measured values from the rotary encoders 71 to 77 (position detectors) provided at the servomotors 41 to 47 (actuators), after the attitude changes, and the attitude parameters Φ at the time of the plurality of attitude changes, the attitude parameters Φ being obtained on the basis of the actual measured values. As a result, with the calibration system according to the present embodiment, calibration is performed by obtaining the parameter deviations of the robot constants of the manipulator on the basis of the differences between the joint position command values and the actual measured values and the attitude parameter for each different attitude, so it is possible to easily achieve the advantageous effect described in the above (5).

(7) In the calibration system according to the present embodiment, it is possible to easily achieve the advantageous effects described in the above (5) and (6) for the manipulator 10 that has one degree of redundancy that is a difference between the number of dimensions of the working space of the manipulator 10 and the degree of freedom of the link structure of the manipulator 10.

(8) In the calibration system according to the present embodiment, the reference point at which the distal end of the manipulator 10 is fixed is set to a reference location at which a workpiece that the manipulator 10 works on is placed. As a result, it is possible to provide the calibration system in which the tool is able to accurately work on a workpiece.

Second Embodiment

Next, a second embodiment will be described with reference to FIG. 6A to FIG. 7. Like reference numerals denote the same or corresponding components to those of the first embodiment, the description thereof is omitted, and different components will be described.

Figure 6A:
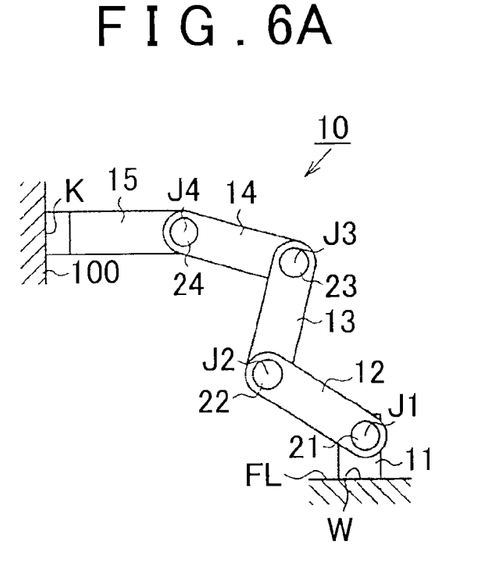
FIG. 6A to FIG. 6C are schematic views for illustrating a calibration method for a manipulator having a redundancy according to a second embodiment.
Figure 6B:
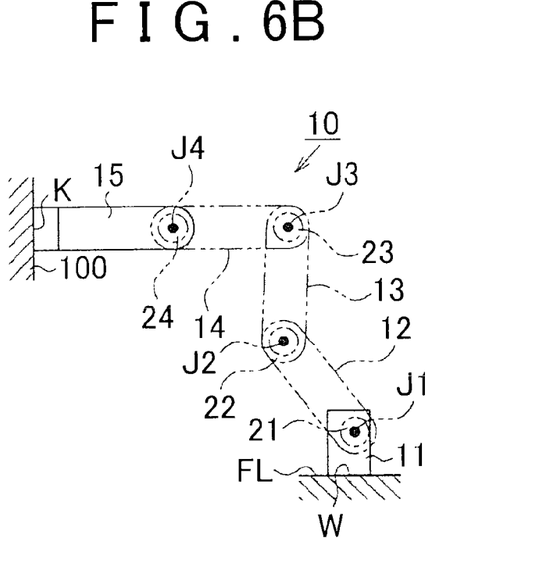
Figure 6C:
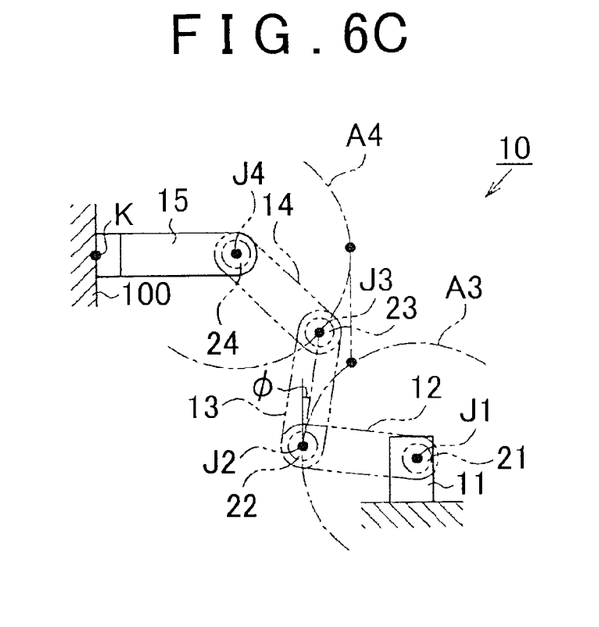
Figure 7:
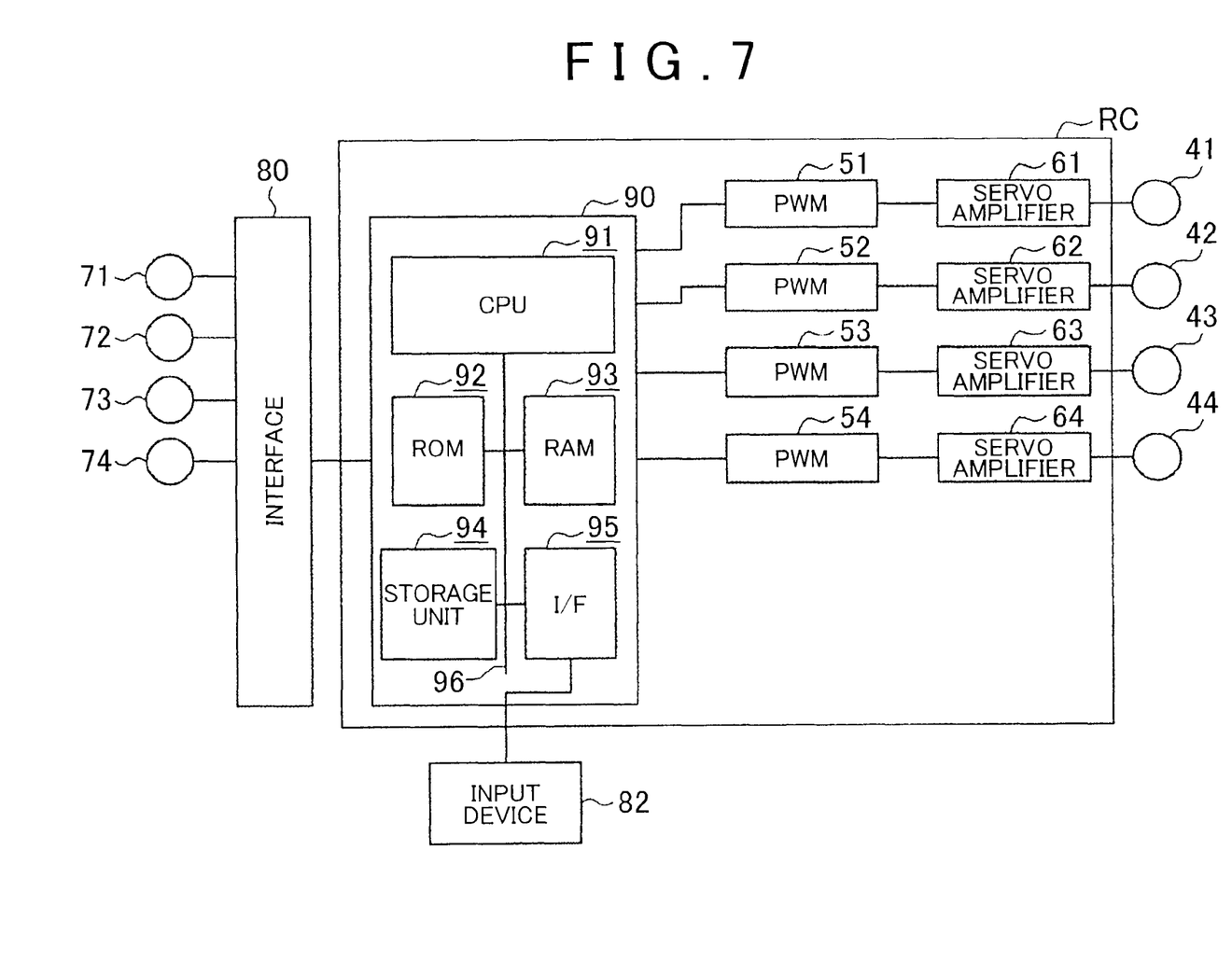
FIG. 7 is a schematic configuration view of a calibration system according to the second embodiment.

As shown in FIG. 6A and FIG. 6B, the manipulator 10 according to the present embodiment is formed of the first link 11 to the fifth link 15, and the links are coupled by the first joint 21 to the fourth joint 24. The J1 axis to the J4 axis that are the respective joint axes are mutually parallel axes in a direction perpendicular to the sheet. As shown in FIG. 7, a calibration system according to the present embodiment has a smaller number of links than that of the first embodiment, so the rotary encoders 75 to 77 are omitted and the servomotors 45 to 47 are omitted in accordance with a reduction in the number of links.

Thus, even when the distal end of the manipulator 10 is fixed to the fixed object 100, the manipulator 10 is able to move within a plane included in the sheet as shown in FIG. 6A and FIG. 6B. That is, in the manipulator 10 according to the present embodiment, the link structure has 3 degrees of freedom, the coordinates are two-dimensional coordinate values (x, y) and the number of dimensions of the working space of the manipulator 10 is 2, so the difference between the degrees of freedom of the link structure and the number of dimensions of the working space is 1. In the present embodiment, a calibration method and a calibration system that utilize this redundancy are configured.

In the manipulator 10 according to the present embodiment, the second link 12 draws a circle A3 that has a center that coincides with the J1 axis and a radius that is the link length of the second link 12. In addition, the fourth link 14 draws a circle A4 that has a center that coincides with the J4 axis and a radius that is the link length of the fourth link 14. While both ends of the third link 13 are respectively located along the circle A3 and the circle A4, the attitude is changed. Then, as shown in FIG. 6C, the attitude parameter Φ according to the present embodiment is, for example, an angle that indicates the attitude with reference to a vertical line that passes through the J2 axis. The reference line is not limited to the vertical line. The reference line may be any line that can be specified.

In the thus configured manipulator 10, as in the case of the first embodiment, in S10 in order of the flowchart of FIG. 5, the distal end of the fifth link 15 of the manipulator 10 is fixed to the fixed object 100.

In the present embodiment, fixing the distal end of the manipulator 10 to the fixed object 100 means constraining 2 degrees of freedom within 3 degrees of freedom of the manipulator 10 and leaving 1 degree of freedom.

In S20, the coordinate values of the reference point K are acquired. In S30, as shown in FIG. 6C, attitude change is performed a number of times larger than or equal to the number of the robot constants p. In S40, the worker starts up the calibration program by operating the input device 82, and causes the CPU 91 to compute the joint coordinates θ1 to θ4 of the joints for each attitude change on the basis of the rotation angles of the joints, which are acquired for each attitude change in S30, and to store those calculated results in the storage unit 94. The CPU 91 acquires the joint coordinates of each of the first joint 21 and the second joint 22 to the fourth joint 24 in the world coordinate system on the basis of the rotation angles acquired from the rotary encoders 71 to 74, and stores the calculated results in the storage unit 94.

In S50, an attitude parameter Φ for each attitude change in S30 is computed from the joint coordinates calculated in S40.

In S60, the CPU 91 sets the joint coordinates θ1 to θ4 by the mathematical expression (7) instead of the mathematical expression (1) according to the first embodiment, uses the mathematical expression (8) instead of the mathematical expression (3), and defines the differences dθ between the joint position command values and the actual measured values, Jacobian matrix J and the parameter deviations dp by the mathematical expression (9) instead of the mathematical expression (4).

[Mathematical Expression 7]

$$\theta_1 = f_1(X, p, \phi) \\ \theta_2 = f_2(X, p, \phi) \\ \vdots \\ \theta_4 = f_4(X, p, \phi)$$

(7)

-continued

[Mathematical Expression 8]

$$d\theta_1 = \frac{\Delta f_1(X, p, \phi)}{\Delta p_1}dp_1 + \frac{\Delta f_1(X, p, \phi)}{\Delta p_2}dp_2 + \ldots + \frac{\Delta f_1(X, p, \phi)}{\Delta p_n}dp_n \quad (8)$$

$$d\theta_2 = \frac{\Delta f_2(X, p, \phi)}{\Delta p_1}dp_1 + \frac{\Delta f_2(X, p, \phi)}{\Delta p_2}dp_2 + \ldots + \frac{\Delta f_2(X, p, \phi)}{\Delta p_n}dp_n$$

$$\vdots$$

$$d\theta_4 = \frac{\Delta f_4(X, p, \phi)}{\Delta p_1}dp_1 + \frac{\Delta f_4(X, p, \phi)}{\Delta p_2}dp_2 + \ldots + \frac{\Delta f_4(X, p, \phi)}{\Delta p_n}dp_n$$

[Mathematical Expression 9]

$$d\theta = \begin{bmatrix} d\theta_{1\phi=\phi_1} \\ d\theta_{2\phi=\phi_1} \\ \vdots \\ d\theta_{4\phi=\phi_1} \\ \vdots \\ d\theta_{1\phi=\phi_k} \\ d\theta_{2\phi=\phi_k} \\ \vdots \\ d\theta_{4\phi=\phi_k} \end{bmatrix}, J = \begin{bmatrix} \frac{\Delta f_1(\phi_1)}{\Delta p_1} & \frac{\Delta f_1(\phi_1)}{\Delta p_2} & \ldots & \frac{\Delta f_1(\phi_1)}{\Delta p_n} \\ \frac{\Delta f_2(\phi_1)}{\Delta p_1} & \frac{\Delta f_2(\phi_1)}{\Delta p_2} & \ldots & \frac{\Delta f_2(\phi_1)}{\Delta p_n} \\ \vdots \\ \frac{\Delta f_7(\phi_1)}{\Delta p_1} & \frac{\Delta f_7(\phi_1)}{\Delta p_2} & \ldots & \frac{\Delta f_7(\phi_1)}{\Delta p_n} \\ \vdots \\ \frac{\Delta f_1(\phi_k)}{\Delta p_1} & \frac{\Delta f_1(\phi_k)}{\Delta p_2} & \ldots & \frac{\Delta f_1(\phi_k)}{\Delta p_n} \\ \frac{\Delta f_2(\phi_k)}{\Delta p_1} & \frac{\Delta f_2(\phi_k)}{\Delta p_2} & \ldots & \frac{\Delta f_2(\phi_k)}{\Delta p_n} \\ \vdots \\ \frac{\Delta f_4(\phi_k)}{\Delta p_1} & \frac{\Delta f_4(\phi_k)}{\Delta p_2} & \ldots & \frac{\Delta f_4(\phi_k)}{\Delta p_n} \end{bmatrix}, \quad (9)$$

$$dp = \begin{bmatrix} dp_1 \\ dp_2 \\ \vdots \\ dp_n \end{bmatrix}$$

In the mathematical expression (9), "$q\phi=\phi r$" (q=1 to 4, r=1 to k) suffixed to $d\theta$ indicates that q relates to the Jq axis, and r relates to the rth attitude change.

When a solution to the above mathematical expression is obtained through a method of least squares using the mathematical expression (5), the mathematical expression (6) is obtained. Hereinafter, as in the case of the first embodiment, the CPU 91 updates the robot constants from the obtained parameter deviations and repeatedly makes convergence calculation until the distal end positional deviation becomes smaller than or equal to a preset threshold. Thus, the CPU 91 identifies the robot constants.

According to the second embodiment as well, similar advantageous effects to (1) to (8) of the first embodiment are obtained.

Third Embodiment

Next, a third embodiment will be described with reference to FIG. 8 and FIG. 9. The manipulator 10 according to the present embodiment differs from the manipulator 10 according to the first embodiment in that a ninth link 19 is coupled between the fourth link 14 and the fifth link 15 via the fourth joint 24 and an eighth joint 28. The joint axis (J8 axis) of the eighth joint 28 is parallel to the J4 axis. In addition, when electric power is supplied to the servomotor 44 of the fourth joint 24, the servomotor 44 turns the ninth link 19 with respect to the fourth link 14.

Figure 8:
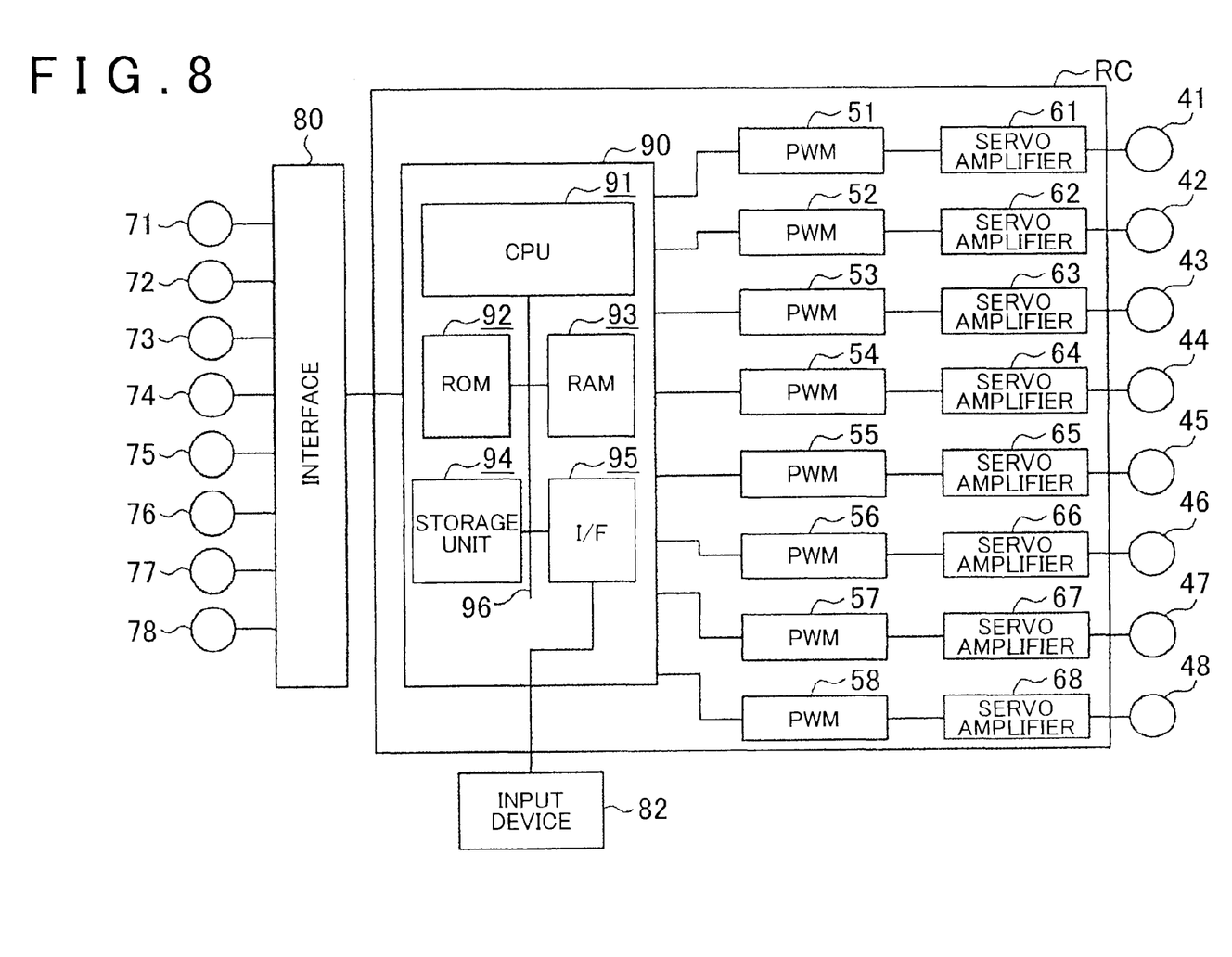
FIG. 8 is a schematic configuration view of a calibration system according to a third embodiment.
Figure 9:
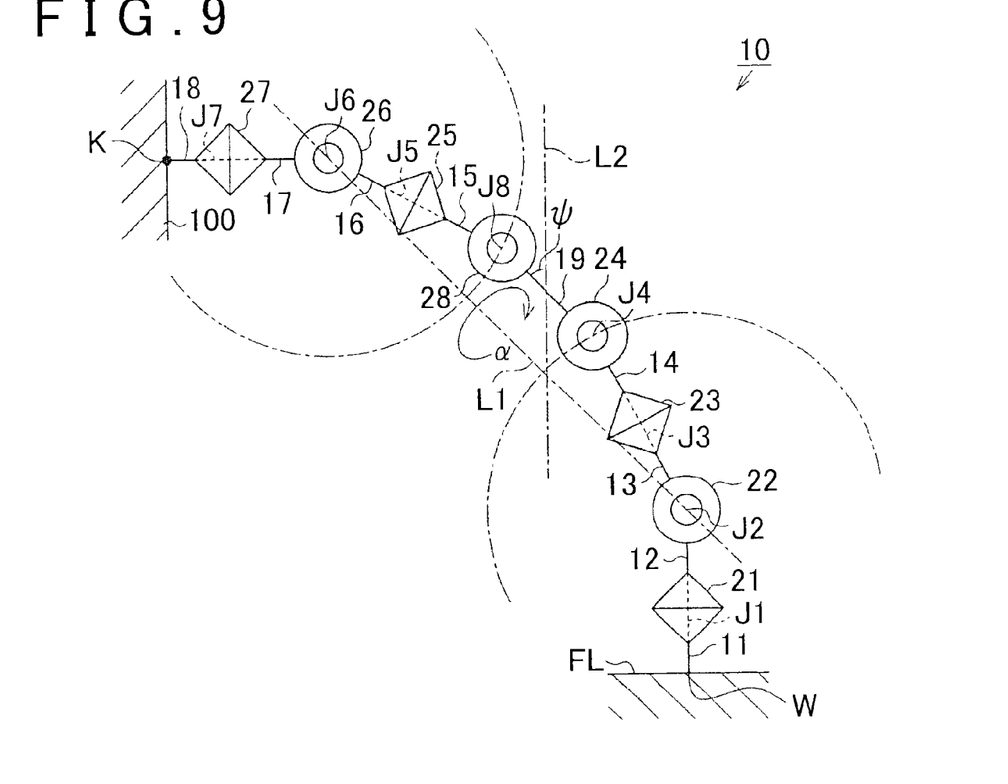
FIG. 9 is a schematic view for illustrating a calibration method for a robot having a redundancy according to the third embodiment.

An eighth servomotor 48 shown in FIG. 8 is installed in the eighth joint 28. When electric power is supplied to the eighth servomotor 48, the eighth servomotor 48 turns the fifth link 15 with respect to the ninth link 19. In addition, a rotary encoder 78 that serves as a position detector is incorporated in the eighth servomotor 48.

The manipulator 10 according to the present embodiment is a robot that has 8 degrees of freedom (degree of freedom n=8), in which the links 12 to 19 are allowed to turn at the eight joints 21 to 28. The number of dimensions (number of dimensions m) of a working space of the manipulator 10 is 6, and has two degrees of redundancy (=n−m).

The calibration system according to the present embodiment differs from the calibration system according to the first embodiment in that the components of the above-described differences are provided. In addition, in the present embodiment, as shown in FIG. 9, when the attitude is changed in a state where the distal end of the manipulator 10 is fixed, a rotation angle $\alpha$ of the ninth link 19 around a rotation axis L1 that coincides with a line that passes through both the intersection of the J3 axis with the J2 axis and the intersection of the J6 axis with the J7 axis is set as one attitude parameter, and an angle $\psi$ made by the ninth link 19 with respect to a vertical axis L2 extending from the floor surface FL is set as another attitude parameter. The rotation angle $\alpha$ is an angle with reference to an arbitrary attitude.

Thus, when the calibration system is used by executing the calibration method in accordance with the flowchart according to the first embodiment, S10 to S40 are executed sequentially, and, in S50, the rotation angle $\alpha$ and the angle $\psi$ that are the above-described attitude parameters are calculated on the basis of the joint coordinates.

In the present embodiment, fixing the distal end of the manipulator 10 to the fixed object 100 means constraining 6 degrees of freedom within 8 degrees of freedom of the manipulator 10 and leaving 2 degrees of freedom.

In addition, in S60, the mathematical expression (10) is used instead of the mathematical expression (1) according to the first embodiment, and the mathematical expression (11) is used instead of the mathematical expression (3).

[Mathematical Expression 10]

$$\theta_1 = f_1(X, p, \phi, \psi) \quad (10)$$
$$\theta_2 = f_2(X, p, \phi, \psi)$$
$$\vdots$$
$$\theta_8 = f_8(X, p, \phi, \psi)$$

[Mathematical Expression 11]

$$d\theta_1 = \frac{\Delta f_1(X, p, \phi, \psi)}{\Delta p_1}dp_1 + \quad (11)$$
$$\frac{\Delta f_1(X, p, \phi, \psi)}{\Delta p_2}dp_2 + \ldots + \frac{\Delta f_1(X, p, \phi, \psi)}{\Delta p_n}dp_n$$

$$d\theta_2 = \frac{\Delta f_2(X, p, \phi, \psi)}{\Delta p_1}dp_1 + \frac{\Delta f_2(X, p, \phi, \psi)}{\Delta p_2}dp_2 +$$
$$\ldots + \frac{\Delta f_2(X, p, \phi, \psi)}{\Delta p_n}dp_n$$

$$\vdots$$

$$d\theta_8 = \frac{\Delta f_7(X, p, \phi, \psi)}{\Delta p_1}dp_1 +$$
$$\frac{\Delta f_8(X, p, \phi, \psi)}{\Delta p_2}dp_2 + \ldots + \frac{\Delta f_8(X, p, \phi, \psi)}{\Delta p_n}dp_n$$

-continued

[Mathematical Expression 12]

$$d\theta = \begin{bmatrix} d\theta_{1\phi=\phi_1,\psi=\psi_1} \\ d\theta_{2\phi=\phi_1,\psi=\psi_1} \\ \vdots \\ d\theta_{8\phi=\phi_1,\psi=\psi_1} \\ \vdots \\ d\theta_{1\phi=\phi_k,\psi=\psi_h} \\ d\theta_{2\phi=\phi_k,\psi=\psi_h} \\ \vdots \\ d\theta_{8\phi=\phi_k,\psi=\psi_h} \\ \vdots \\ d\theta_{1\phi=\phi_m,\psi=\psi_n} \\ d\theta_{2\phi=\phi_m,\psi=\psi_n} \\ \vdots \\ d\theta_{8\phi=\phi_m,\psi=\psi_n} \end{bmatrix}, \quad (12)$$

$$J = \begin{bmatrix} \frac{\Delta f_1(\phi_1,\phi_1)}{\Delta p_1} & \frac{\Delta f_1(\phi_1,\phi_1)}{\Delta p_2} & \cdots & \frac{\Delta f_1(\phi_1,\phi_1)}{\Delta p_n} \\ \frac{\Delta f_2(\phi_1,\phi_2)}{\Delta p_1} & \frac{\Delta f_2(\phi_1,\phi_1)}{\Delta p_2} & \cdots & \frac{\Delta f_2(\phi_1,\phi_1)}{\Delta p_n} \\ \vdots & & & \\ \frac{\Delta f_8(\phi_1,\phi_1)}{\Delta p_1} & \frac{\Delta f_8(\phi_1,\phi_1)}{\Delta p_2} & \cdots & \frac{\Delta f_8(\phi_1,\phi_1)}{\Delta p_n} \\ \vdots & & & \\ \frac{\Delta f_1(\phi_k,\phi_h)}{\Delta p_1} & \frac{\Delta f_1(\phi_k,\phi_h)}{\Delta p_2} & \cdots & \frac{\Delta f_1(\phi_k,\phi_h)}{\Delta p_n} \\ \frac{\Delta f_2(\phi_k,\phi_h)}{\Delta p_1} & \frac{\Delta f_2(\phi_k,\phi_h)}{\Delta p_2} & \cdots & \frac{\Delta f_8(\phi_k,\phi_h)}{\Delta p_n} \\ \vdots & & & \\ \frac{\Delta f_8(\phi_k,\phi_h)}{\Delta p_1} & \frac{\Delta f_8(\phi_k,\phi_h)}{\Delta p_2} & \cdots & \frac{\Delta f_8(\phi_k,\phi_h)}{\Delta p_n} \\ \vdots & & & \\ \frac{\Delta f_1(\phi_m,\phi_n)}{\Delta p_1} & \frac{\Delta f_1(\phi_m,\phi_n)}{\Delta p_2} & \cdots & \frac{\Delta f_1(\phi_m,\phi_n)}{\Delta p_n} \\ \frac{\Delta f_2(\phi_m,\phi_n)}{\Delta p_1} & \frac{\Delta f_2(\phi_m,\phi_n)}{\Delta p_2} & \cdots & \frac{\Delta f_2(\phi_m,\phi_n)}{\Delta p_n} \\ \vdots & & & \\ \frac{\Delta f_8(\phi_m,\phi_n)}{\Delta p_1} & \frac{\Delta f_8(\phi_m,\phi_n)}{\Delta p_2} & \cdots & \frac{\Delta f_8(\phi_m,\phi_n)}{\Delta p_n} \end{bmatrix}, \quad dp = \begin{bmatrix} dp_1 \\ dp_2 \\ \vdots \\ dp_n \end{bmatrix}$$

In addition, the parameter differences are obtained by the mathematical expression (5) and the mathematical expression (6) using the differences dθ between the joint position command values and the actual measured values, Jacobian matrix J and the parameter deviations dp shown in the mathematical expression (12) instead of the mathematical expression (4).

In the mathematical expression (12), "qφ=φr" (q=1 to 8, r=1 to k to m) suffixed to dθ indicates that q relates to the Jq axis, and r relates to the rth attitude change. In addition, in "ψ=ψn" (n=1 to k to n), n indicates that n relates to the nth attitude change for φ. The total value of m and n is larger than or equal to the number of robot constants.

The CPU 91 updates the robot constants from the obtained parameter deviations and repeatedly makes convergence calculation until the distal end positional deviation becomes smaller than or equal to a preset threshold. Thus, the CPU 91 identifies the robot constants. The present embodiment has the following features.

(1) The calibration method according to the present embodiment is able to easily achieve the advantageous effects described in (1) and (2) of the first embodiment for the manipulator 10 that has two degrees of redundancy that is a difference between the number of dimensions of the working space of the manipulator 10 and the degrees of freedom of the link structure of the manipulator 10.

(2) In the calibration system according to the present embodiment, it is possible to easily achieve the advantageous effects described in (5) and (6) of the first embodiment for the manipulator 10 that has two degrees of redundancy that is a difference between the number of dimensions of the working space of the manipulator 10 and the degrees of freedom of the link structure of the manipulator 10.

Fourth Embodiment

Next, a fourth embodiment will be described with reference to FIG. 10. Here, the configuration of the manipulator 10 will be described, and it should be understood that a calibration system includes servomotors and rotary encoders on the basis of the number of links and the number of joints.

Figure 10:
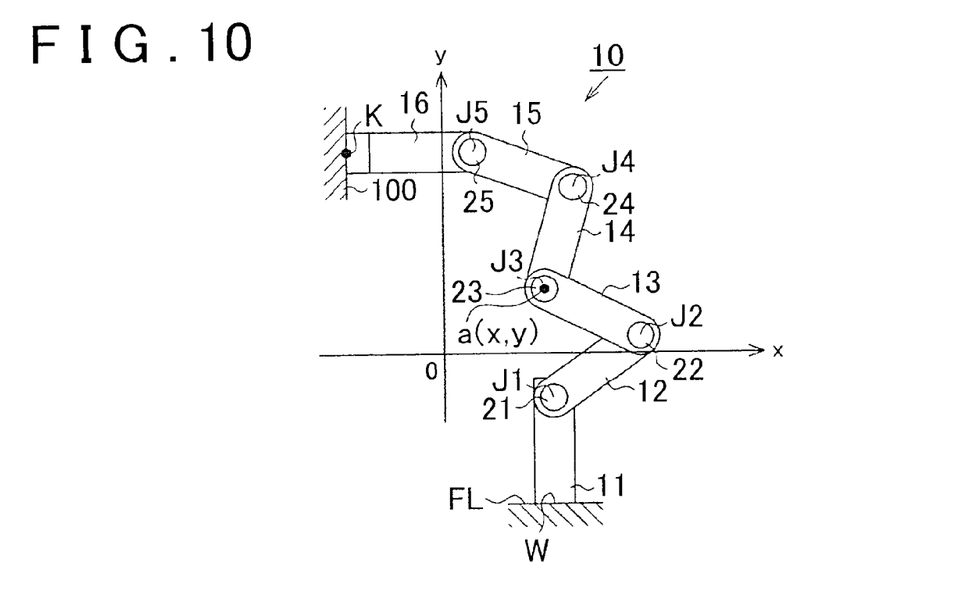
FIG. 10 is a schematic view for illustrating a calibration method for a robot having a redundancy according to a forth embodiment.

As shown in FIG. 10, the manipulator 10 according to the present embodiment includes the first link 11 to the sixth link 16 and the first joint 21 to the fifth joint 25 between the links, and the J1 axis to the J5 axis that are the joint axes of the first joint 21 to the fifth joint 25 are axes perpendicular to the sheet and parallel to one another.

In a calibration method according to the present embodiment, the distal end of the manipulator 10 is fixed to the fixed object 100, and, hereinafter, the process is executed in accordance with a flowchart similar to that of the above-described embodiments.

In the present embodiment, fixing the distal end of the manipulator 10 to the fixed object 100 means constraining 3 degrees of freedom within 5 degrees of freedom of the manipulator 10 in plane and leaving 2 degrees of freedom. In the manipulator 10 according to the present embodiment, the link structure has 5 degrees of freedom, the coordinates are two-dimensional coordinate values (x, y) and the number of dimensions of the working space of the manipulator 10 is 2, so the difference between the degrees of freedom of the link structure and the number of dimensions of the working space is 3. Therefore, the attitude parameter according to the present embodiment is set to the coordinate values (x, y) of the J3 axis of the third joint 23. That is, it is possible to specify the attitude of the arm when the coordinate values (x, y) of the J3 axis of the third joint 23 are set. The position and attitude of the attitude parameter are changed through the remaining 2 degrees of freedom. In the present embodiment, each of the coordinate values (x, y) of the J3 axis is defined as the attitude parameter. By so doing, in the fourth embodiment as well, it is possible to obtain the parameter deviations dp by the calibration method according to the flowchart described in the first embodiment.

An embodiment of the invention is not limited to the above-described embodiments; it may be modified as follows.

In the above-described embodiments, the AC motor that serves as the servomotor is used as each of the actuators; instead, each actuator may be a DC motor, and a stepping motor, or the like, may also be used.

In the above-described embodiments, each link is rotated; instead, a cylinder or a solenoid that serves as an actuator may be used to linearly move the link with respect to the adjacent link. In this case, the position detector may be a linear potentiometer, a gap sensor, such as a capacitance type or an eddy current type, or the like, which detects a linear displacement of the link.

Although not described in the above-described embodiments, generally, the CPU 91 executes current control over a motor through PI control or PID control, and, when a motor current increases to over a threshold and, as a result, an overload acts on the motor, the CPU 91 is configured to execute motor stop control in order to inhibit the overload. The joint position command values are calculated using constants before calibration, so, when it is determined that the motor current exceeds the threshold and an overload acts on the motor on the basis of the differences between the command values and actual distal end positions, control is executed such that the integral gain of I control is set to 0 and the gain of P control is reduced. By so doing, the motor current reduces, and the motor does not stop due to an overload.

What is claimed is:

1. A calibration method for a robot having a redundancy, comprising:
    constraining a distal end of a manipulator having a redundancy so as to leave at least one degree of freedom within degrees of freedom of the manipulator;
    changing an attitude of the manipulator into a plurality of attitudes that are allowed by the redundancy by outputting joint position command values from a control device to a plurality of actuators that respectively drive a plurality of links that constitute the manipulator of which the distal end is constrained; and
    performing calibration by obtaining a deviation of a robot constant of the manipulator on the basis of the joint position command values and actual measured values from position detectors after each attitude change, the position detectors being respectively provided at the plurality of actuators, wherein
    calibration is performed by obtaining the deviation of the robot constant of the manipulator on the basis of differences between the joint position command values for the plurality of attitude changes and the actual measured values from the position detectors after the attitude changes, and attitude parameters at the time of the plurality of attitude changes, the attitude parameters being obtained on the basis of the actual measured values, and
    the robot constant is identified by a calculation performed until a distal end positional deviation becomes smaller than or equal to a preset threshold.

2. The calibration method according to claim 1, wherein the manipulator has one degree of redundancy that is a difference between the number of dimensions of a working space of the manipulator and degrees of freedom of a link structure of the manipulator.

3. The calibration method according to claim 1, wherein the manipulator has two degrees of redundancy that is a difference between the number of dimensions of a working space of the manipulator and degrees of freedom of a link structure of the manipulator.

4. The calibration method according to claim 1, wherein the manipulator has three degrees of redundancy that is a difference between the number of dimensions of a working space of the manipulator and degrees of freedom of a link structure of the manipulator.

5. The calibration method according to claim 1, wherein a reference point at which the distal end of the manipulator is constrained is a reference location at which a workpiece that the manipulator works on is placed.

6. The calibration method according to claim 1, wherein the plurality of actuators are respectively provided in joints of the plurality of links.

7. A calibration system for a robot having a redundancy, comprising:
    a manipulator that includes a plurality of links coupled so as to have a redundancy, a plurality of actuators respectively provided at joints of the links and position detectors that are respectively provided at the plurality of actuators and that respectively detect positions of joint axes of the links;
    a control device configured to change an attitude of the manipulator into a plurality of attitudes that are allowed by the redundancy by outputting joint position command values to the plurality of actuators in a state where a distal end of the manipulator is constrained so as to leave at least one degree of freedom within degrees of freedom of the manipulator; and
    a computing unit configured to perform calibration by obtaining a deviation of a robot constant of the manipulator on the basis of the joint position command values and actual measured values from the position detectors after each attitude change, wherein
    the computing unit is configured to perform calibration by obtaining the deviation of the robot constant of the manipulator on the basis of differences between the joint position command values for the plurality of attitude changes and the actual measured values from the position detectors after the attitude changes, and attitude parameters at the time of the plurality of attitude changes, the attitude parameters being obtained on the basis of the actual measured values,
    and the robot constant is identified by a calculation performed until a distal end positional deviation becomes smaller than or equal to a preset threshold.

8. The calibration system according to claim 7, wherein the manipulator has one degree of redundancy that is a difference between the number of dimensions of a working space of the manipulator and degrees of freedom of a link structure of the manipulator.

9. The calibration system according to claim 7, wherein the manipulator has two degrees of redundancy that is a difference between the number of dimensions of a working space of the manipulator and degrees of freedom of a link structure of the manipulator.

10. The calibration system according to claim 7, wherein the manipulator has three degrees of redundancy that is a difference between the number of dimensions of a working space of the manipulator and degrees of freedom of a link structure of the manipulator.

11. The calibration system according to claim 7, wherein a reference point at which the distal end of the manipulator is constrained is a reference location at which a workpiece that the manipulator works on is placed.

* * * * *